(12) United States Patent
Wang

(10) Patent No.: US 7,258,459 B2
(45) Date of Patent: Aug. 21, 2007

(54) ADJUSTABLE ILLUMINATING LAMP FOR AQUARIUM

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 2 days.

(21) Appl. No.: 11/267,497

(22) Filed: Nov. 7, 2005

(65) Prior Publication Data

US 2007/0103906 A1     May 10, 2007

(51) Int. Cl.
*F21V 33/00* (2006.01)
(52) U.S. Cl. ............... 362/101; 362/219; 362/225; 362/285; 362/418
(58) Field of Classification Search ........... 362/219, 362/225, 220, 432, 285, 418, 217, 382, 253, 362/101, 396; 119/266
See application file for complete search history.

(56) References Cited

U.S. PATENT DOCUMENTS

| 4,498,126 | A | * | 2/1985 | Hernandez | 362/220 |
| 4,961,127 | A | * | 10/1990 | Shemitz et al. | 362/285 |
| 4,994,943 | A | * | 2/1991 | Aspenwall | 362/219 |
| 5,479,327 | A | * | 12/1995 | Chen | 362/222 |
| 5,607,225 | A | * | 3/1997 | Halvatzis | 362/125 |
| 6,039,457 | A | * | 3/2000 | O'Neal | 362/217 |
| 6,065,849 | A | * | 5/2000 | Chen | 362/101 |

\* cited by examiner

*Primary Examiner*—Thomas M. Sember

(57) ABSTRACT

An adjustable illuminating lamp for an aquarium that mainly has an illuminating main body for receiving a lamp pipe. The illuminating main body is provided on its two lateral ends each with an extendible rod. The extendible rods can be adjusted in their distances from the illuminating main body, and the end of each extendible rod is provided with a clamping means to clamp on either of the lateral sides of the aquarium.

5 Claims, 7 Drawing Sheets

ADJUSTABLE ILLUMINATING LAMP FOR AQUARIUM

BACKGROUND OF THE INVENTION

1. Field of the Invention

The present invention is related to an illuminating lamp for an aquarium, and especially to an adjustable illuminating lamp for an aquarium of which the length can be adjusted to be adapted for aquariums of various sizes.

2. Description of the Prior Art

A conventional illuminating lamp for an aquarium generally is composed of a main body of a lamp shade in combining with a water-proof panel, the main body of the lamp shade is fixedly installed on its end with an electric member such as a set of transformer. On the end having the electric member such as the set of transformer, a connecting rod is extended outwards, and a clamping means is provided on the end of the connecting rod, the clamping means is used to clamp on the aquarium in order that a lamp pipe in the lamp shade emits light to illuminate a water surface.

Such a clamping means provided on one end is subjected to the gravity force of the entire lamp set of which the lamp shade is pended, after a period of time; it has a defect of being subjected to loosening and dropping. Particularly, when in installing on the aquarium, the clamping means provided on one end is very inconvenient for mounting because of its unbalanced designing.

SUMMARY OF THE INVENTION

The present invention mainly provides an adjustable illuminating lamp for an aquarium that mainly has an illuminating main body for receiving a lamp pipe, the illuminating main body is provided on its two lateral ends each with an extendible rod, the extendible rods can be adjusted in their distances from the illuminating main body, and the end of each extendible rod is provided with a clamping means to clamp on either of the lateral sides of the aquarium.

The main function of the present invention is to adjust the lengths of the extendible rods in pursuance of the size of the aquarium; thereby the present invention can be adapted for aquariums of various sizes. And the lamp set can be firmly fixed above a water surface.

Another function of the present invention is to adjust the length of clamping of the clamping means in pursuance of the thicknesses of the lateral plates of the aquarium by rotating bolt heads of locking bolts provided on the clamping means.

The lamp pipe in the illuminating main body of the present invention can be changed to two by amount according to need.

The present invention will be apparent in its structural features and functions in operation after reading the detailed description of the preferred embodiments thereof in reference to the accompanying drawings.

DETAILED DESCRIPTION OF THE PREFERRED EMBODIMENT

Figure 1:
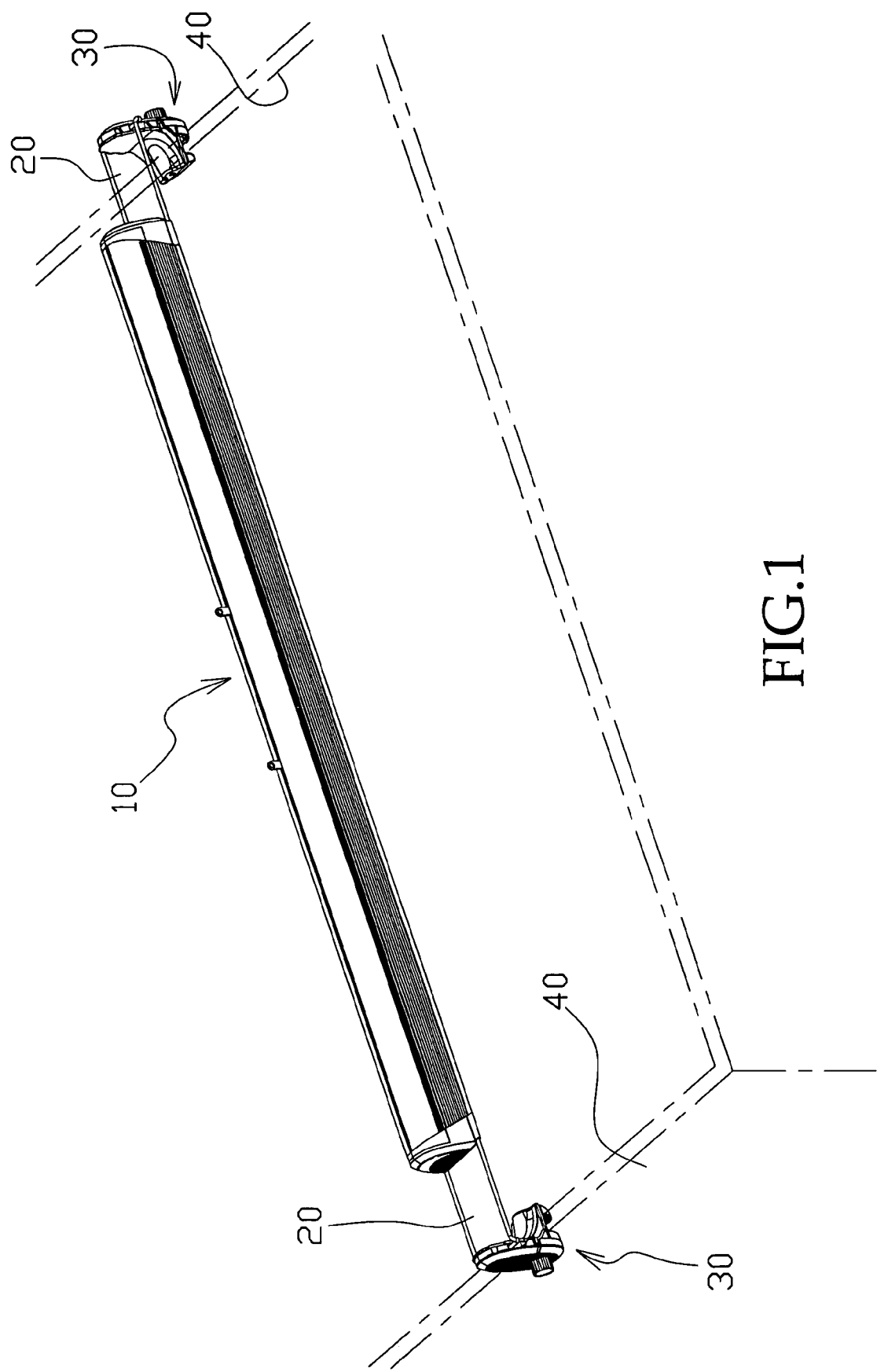
FIG. 1 is a perspective view showing an embodiment of the present invention after assembling.
Figure 2:
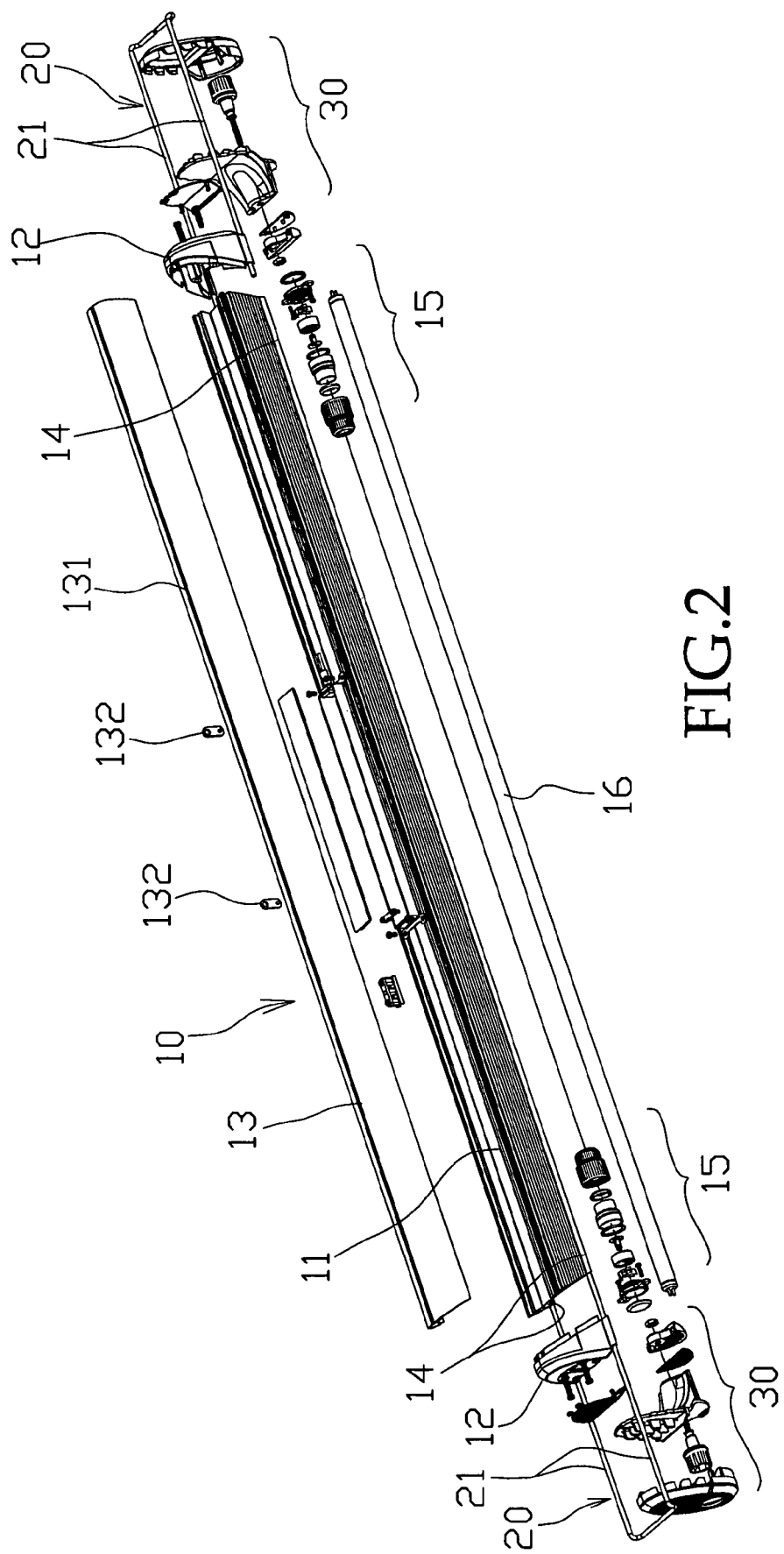
FIG. 2 is an anatomic perspective view of the embodiment of the present invention.

Referring to FIGS. 1 and 2, the adjustable illuminating lamp for an aquarium of the present invention mainly has an illuminating main body 10, the illuminating main body 10 is provided on its two lateral ends each with an extendible rod 20, the end of each extendible rod 20 is provided with a clamping means 30 to clamp on one of two lateral sides 40 of the aquarium, so that the illuminating main body 10 can be firmly fixed above and across a water surface of the aquarium.

Figure 3:
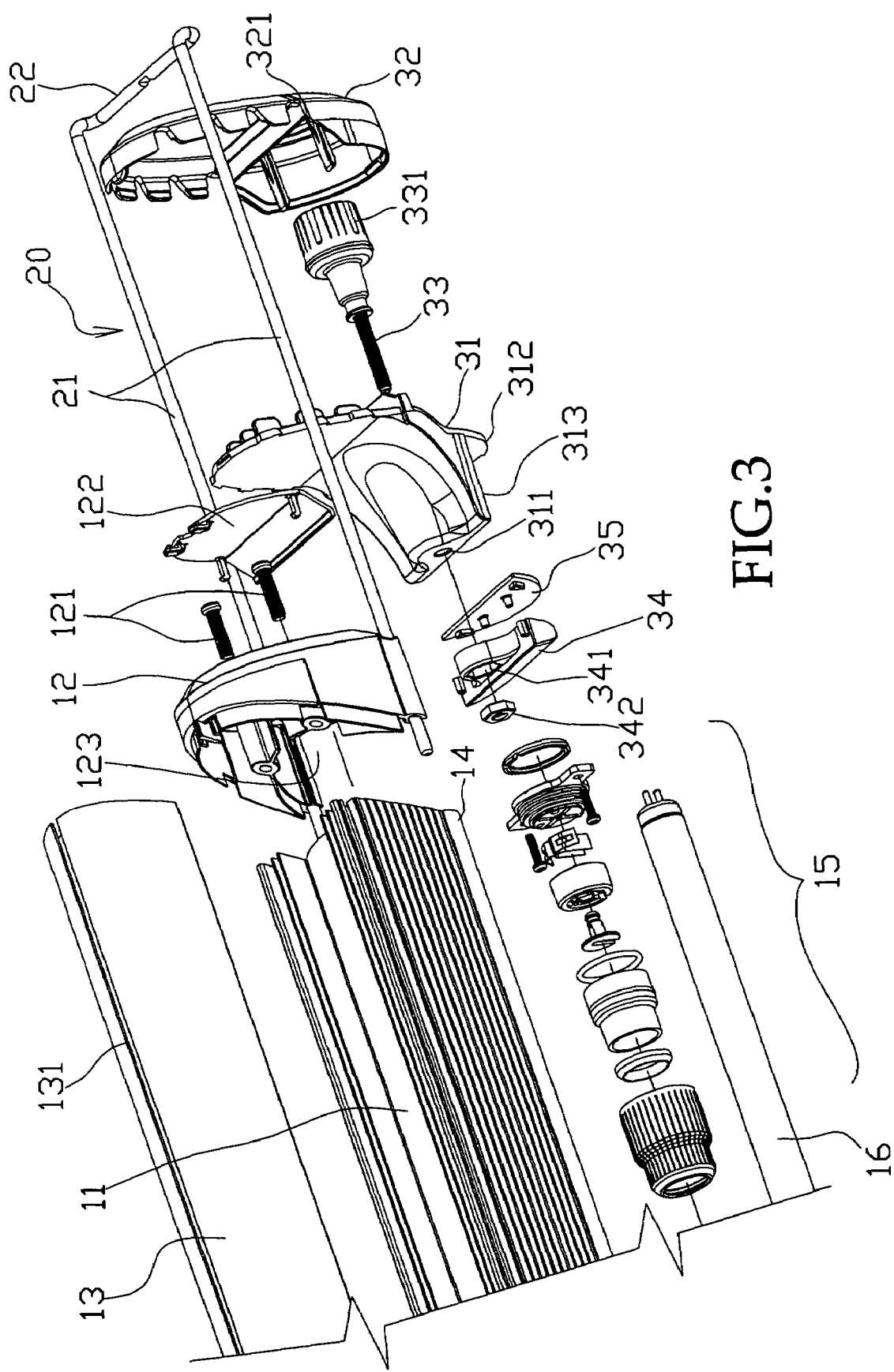
FIG. 3 is a partial enlarged perspective view of the embodiment of FIG. 2.

Further referring to FIGS. 2 and 3, the illuminating main body 10 is provided therein with an elongate lamp shade 11 preferably in an arciform shape, the elongate lamp shade 11 has on its two lateral ends two lateral seats 12, and has an upper lid 13 on its top to cover electric lines and necessary electric parts; the lower edges of the elongate lamp shade 11 form seats 14 with holes of which the holes are provided for extending of the extendible rods 20 therein. The two lateral seats 12 have two sets of lamp heads 15 respectively mounted therein for mounting and fixing a lamp pipe 16.

The two lateral seats 12 are provided to obscure the lateral ends of the elongate lamp shade 11, they are fixed on the elongate lamp shade 11 each by screwing in a couple of screws 121 from outside for fixing, the heads of the screws 121 are covered with a lateral cover 122. The two sets of lamp heads 15 are mounted in arciform recesses 123 in the two lateral seats 12.

The upper lid 13 is engaged in the top surface of the elongate lamp shade 11 and has thereon an elongate slit for mounting a pair of hanging hooks 132.

The extendible rods 20 are U shaped rods, each of them has two elongate side rods 21 that extend through its corresponding lateral seat 12 and into the seats 14 with holes on the lower edges of the elongate lamp shade 11, taking advantage of the lengths of the elongate side rods 21 which can be extended in and out of the seats 14 with the holes, the distance from a transverse rod 22 of each extendible rod 20 to the elongate lamp shade 11 can be adjusted. And the transverse rods 22 of the extendible rods 20 are connected with the two clamping means 30 respectively.

The two clamping means 30 each has an inner seat 31 and an outer seat 32, the seats 31 and 32 are mutually connected and are fixed on the transverse rods 22 of the extendible rods 20. The inner seat 31 has on its lower side a protruding plate 312, a platform 313 extends inwards from the protruding plate 312 and is provided thereon with a through hole 311. An engaging plate 34 is provided inwardly of the inner seat 31 and is provided thereon with a hole 341 for a nut. The nut hole 341 can be mounted therein with a nut 342. A locking screw bolt 33 is extended from outside of the outer seat 32 into the through hole 311 of the inner seat 31 to be connected and locked with the nut 342 of the engaging plate 34. A head 331 of the locking screw bolt 33 is extended out of a round hole 321 of the outer seat 32 to allow holding of a finger to rotate the locking screw bolt 33, and further to adjust the distance between the engaging plate 34 and the protruding plate 312 of the inner seat 31; thereby the protruding plate 312 and the engaging plate 34 can hold either of the lateral sides 40 by clamping. And a slide-proof plate 35 having thereon slide-proof knurls is provided at a contact face between the engaging plate 34 and the lateral side 40.

Figure 4:
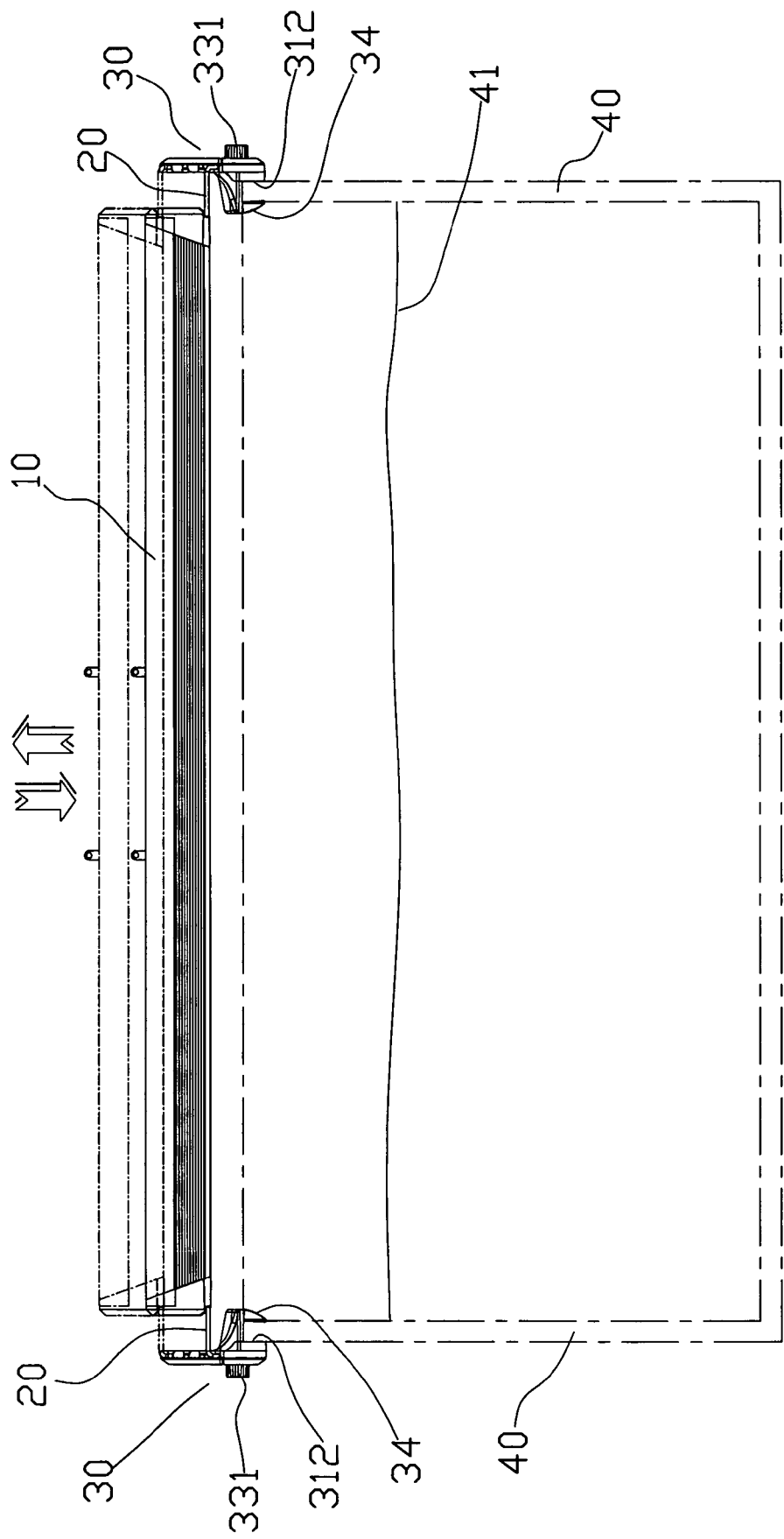
FIG. 4 is a schematic sectional view showing assembling of the embodiment of the present invention.

As to the operation of assembling and detaching of the lateral sides 40 of the aquarium of the present invention, please refer to FIG. 4; wherein the illuminating main body 10 is moved up and down as is shown in the drawing, the clamping means 30 on the extendible rods 20 thus can be clamped on the lateral sides 40 of the aquarium. When in completing assembling, such as is shown by solid lines in the drawing, the head 331 of the locking screw bolt 33 can be rotated to adjust the distance between the protruding plate 312 of the inner seat 31 and the engaging plate 34, until the latter two completely clamp tight the lateral sides 40 of the aquarium, fixing thus is completed, and the illuminating main body 10 is above a water surface 41 of the aquarium.

Evidently, the clamping means 30 of the present invention can be used to adjust the head 331 of the locking screw bolt 33 in pursuance of the thicknesses of the lateral plates 40 of the aquarium, then the function of firmly clamping can be obtained.

Figure 5:
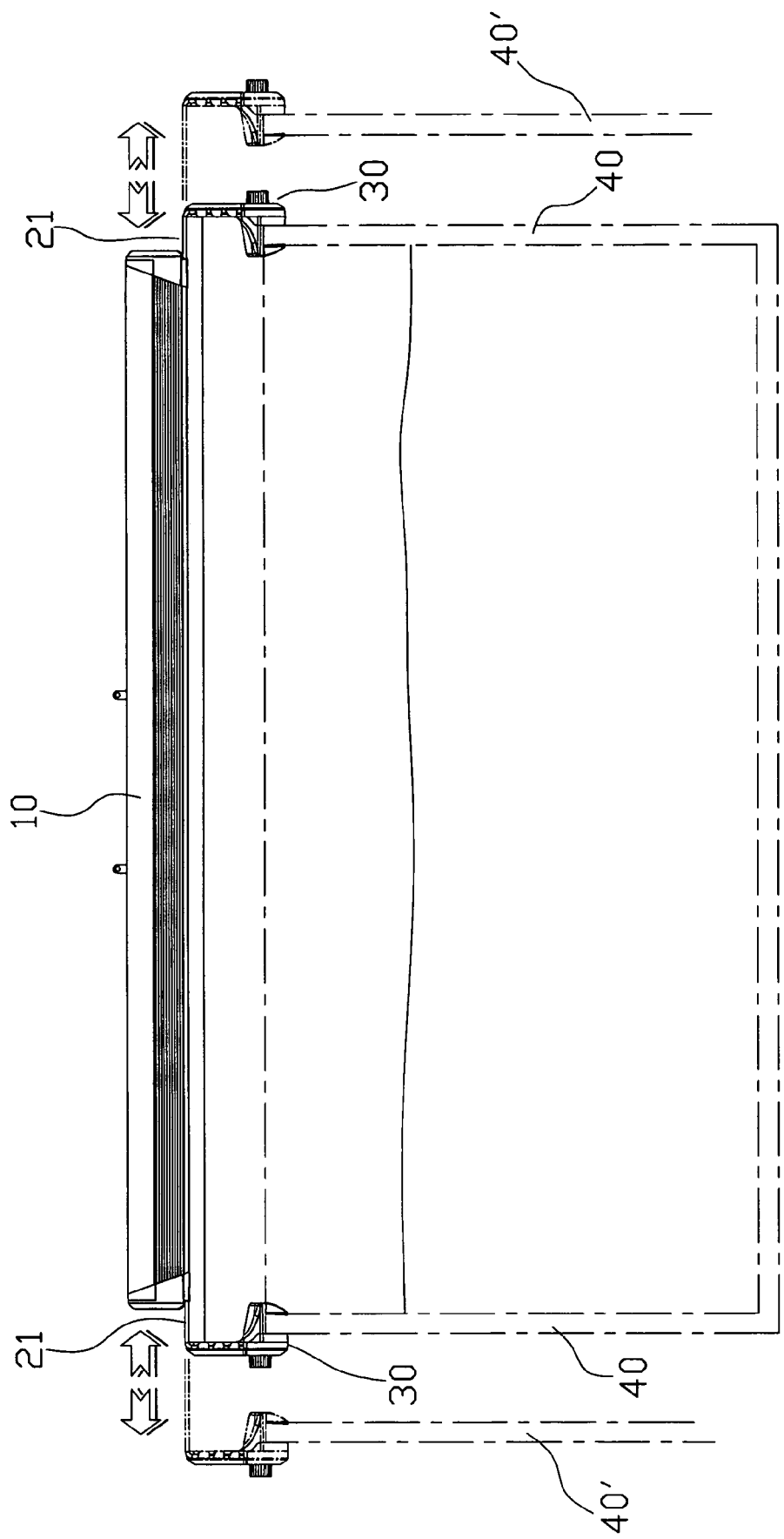
FIG. 5 is schematic sectional view showing adjusting of the embodiment of the present invention.

And referring to FIG. 5, the clamping means 30 of the present invention are mounted on the extendible rods 20, when a larger aquarium with lateral plates 40 are used, the elongate side rods 21 of the extendible rods 20 can be pulled to increase their lengths relative to the illuminating main body 10 of the lamp as is shown by dot lines in the drawing, and the clamping means 30 are firmly mounted.

Figure 6:
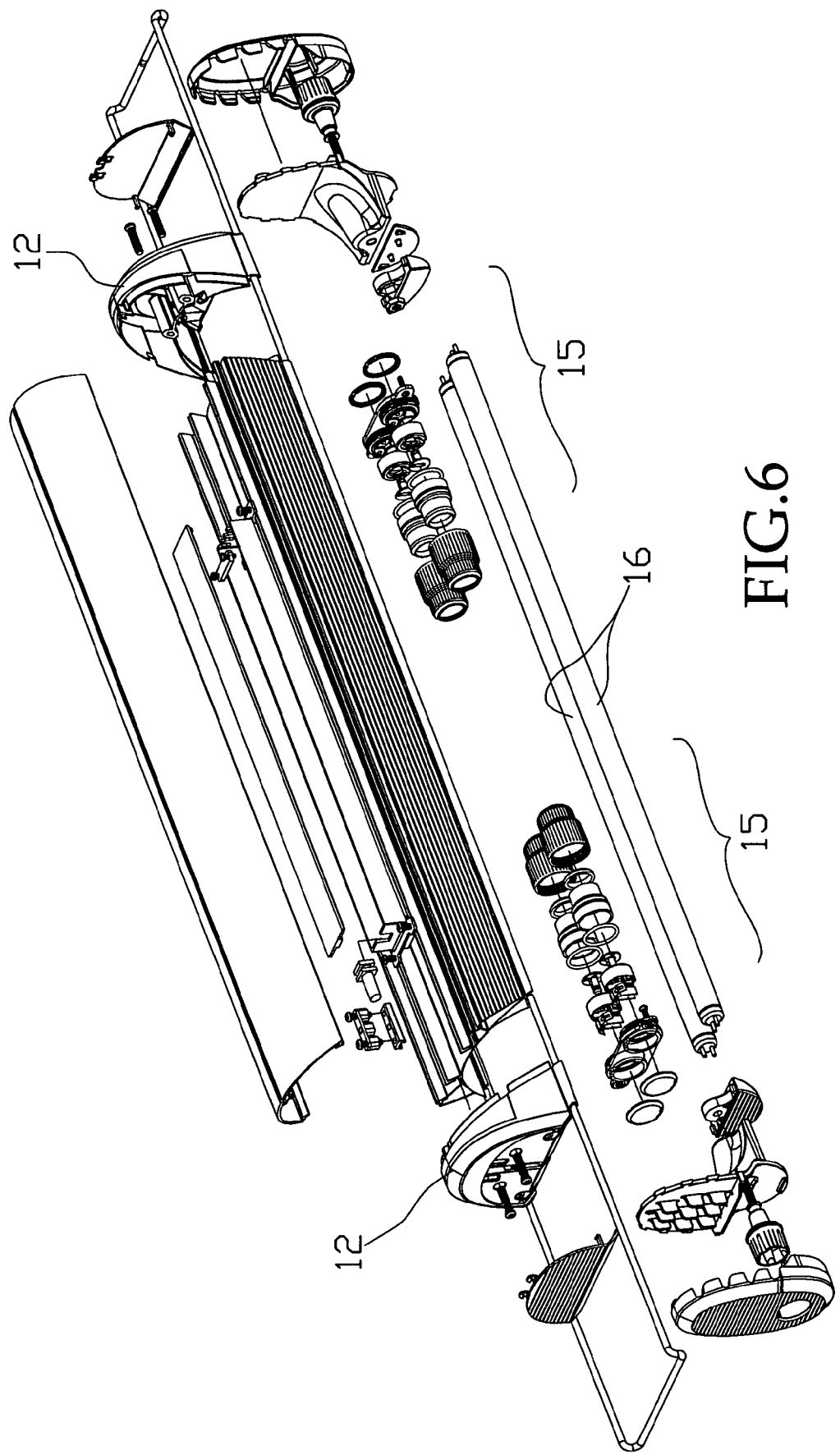
FIG. 6 is an anatomic perspective view of another embodiment of the present invention, wherein two lamp pipes are provided.
Figure 7:
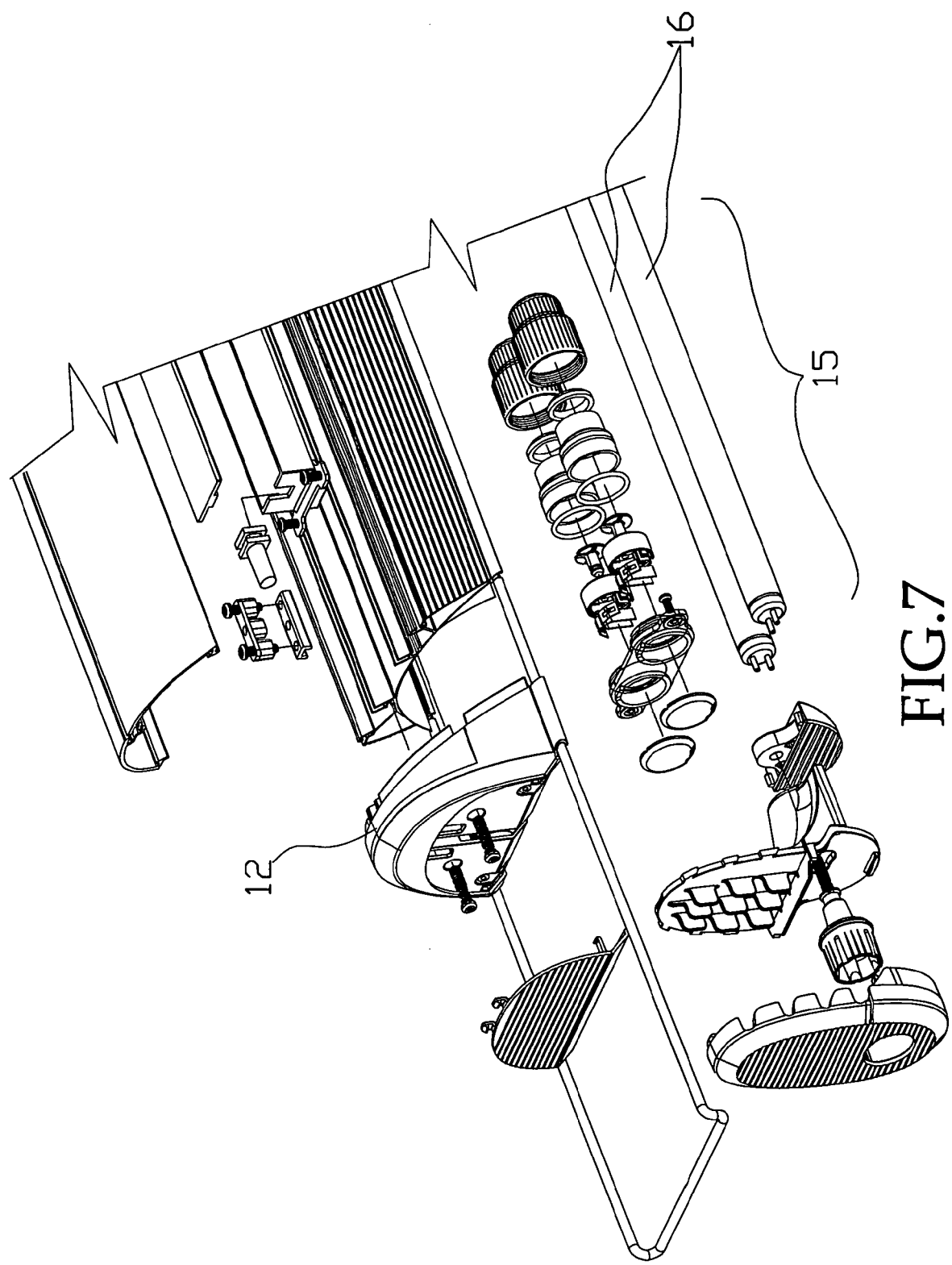
FIG. 7 is a partial enlarged perspective view of the embodiment of FIG. 6.

Certainly, the lamp pipe 16 in the illuminating main body 10 of the present invention can be changed by amount, referring to FIGS. 6 and 7, two sets of lamp heads 15 are mounted in each of the two lateral seats 12, thereby two lamp pipes 16 can be mounted.

My invention is to be construed as including all modifications and variations falling within the scope of the appended claims.

The invention claimed is:

1. An adjustable illuminating lamp for an aquarium comprising:
    an illuminating main body for receiving therein a lamp pipe;
    a pair of extendible rods provided on two lateral ends of said illuminating main body to adjust their distances from said illuminating main body;
    a pair of clamping means respectively provided on an end of each of said extendible rods to clamp on lateral sides of said aquarium,
    wherein said illuminating main body is provided therein with an elongate lamp shade, said elongate lamp shade has on its two lateral ends two lateral seats, and has an upper lid on its top to cover electric lines and necessary electric parts; said two lateral seats have two sets of lamp heads respectively mounted therein for mounting and fixing a lamp pipe,
    wherein said two lateral seats are provided to obscure said lateral ends of said elongate lamp shade, and are fixed on said elongate lamp shade each by screwing in a couple of screws from outside for fixing, heads of said screws on each of said lateral ends of said elongate lamp shade are covered with a lateral cover.

2. The adjustable illuminating lamp for an aquarium as claimed in claim 1, wherein
    said upper lid is engaged in a top surface of said elongate lamp shade and has thereon an elongate slit for mounting a pair of hanging hooks.

3. An adjustable illuminating lamp for an aquarium comprising:
    an illuminating main body for receiving therein a lamp pipe;
    a pair of extendible rods provided on two lateral ends of said illuminating main body to adjust their distances from said illuminating main body;
    a pair of clamping means respectively provided on an end of each of said extendible rods to clamp on lateral sides of said aquarium,
    wherein said illuminating main body is provided therein with an elongate lamp shade, said elongate lamp shade has on its two lateral ends two lateral seats, and has an upper lid on its top to cover electric lines and necessary electric parts; said two lateral seats have two sets of lamp heads respectively mounted therein for mounting and fixing a lamp pipe,
    wherein lower edges of said elongate lamp shade form seats with holes of which said holes are provided for extending of said extendible rods therein,
    wherein said extendible rods are U shaped rods, each of said U shaped rods has two elongate side rods that extend through a corresponding one of said lateral seats and into said seats with said holes on said lower edges of said elongate lamp shade; taking advantage of the lengths of said elongate side rods which are adapted to extending in and out of said seats with said holes, the distance from a transverse rod of each of said extendible rods to said elongate lamp shade is adapted to adjusting.

4. An adjustable illuminating lamp for an aquarium comprising:
    an illuminating main body for receiving therein a lamp pipe;
    a pair of extendible rods provided on two lateral ends of said illuminating main body to adjust their distances from said illuminating main body;
    a pair of clamping means respectively provided on an end of each of said extendible rods to clamp on lateral sides of said aquarium,
    wherein said two clamping means each has an inner seat and an outer seat, said inner seat and outer seats are mutually connected and are fixed on said transverse rods of said extendible rods; said inner seat has on its lower side a protruding plate, a platform extends inwards from said protruding plate and is provided thereon with a through hole; an engaging plate is provided inwardly of said inner seat and is provided thereon with a hole for a nut, said nut hole is adapted to receiving therein a nut; a locking screw bolt is extended from outside of said outer seat into said through hole of said inner seat to be connected and locked with said nut of said engaging plate; a head of said locking screw bolt is extended out of a round hole of said outer seat to allow holding of a finger to rotate said locking screw bolt, and further to adjust the distance between said engaging plate and said protruding plate of said inner seat; thereby said protruding plate and said engaging plate hold either of said lateral sides by clamping.

5. The adjustable illuminating lamp for an aquarium as claimed in claim 4, wherein
    a slide-proof plate having thereon slide-proof knurls is provided at a contact face between said engaging plate and said lateral side.

* * * * *